United States Patent
Radov et al.

(10) Patent No.: US 8,716,915 B2
(45) Date of Patent: May 6, 2014

(54) AXIALLY-SPLIT STATOR CONSTRUCTION FOR ELECTRIC MOTORS

(75) Inventors: Maxim Y. Radov, Astrakhan (RU); Jacques Orban, Orem, UT (US); John E. Davis, Bixby, OK (US)

(73) Assignee: Schlumberger Technology Corporation, Sugar Land, TX (US)

(*) Notice: Subject to any disclaimer, the term of this patent is extended or adjusted under 35 U.S.C. 154(b) by 220 days.

(21) Appl. No.: 12/995,964

(22) PCT Filed: Jun. 6, 2008

(86) PCT No.: PCT/RU2008/000350
§ 371 (c)(1),
(2), (4) Date: Feb. 23, 2012

(87) PCT Pub. No.: WO2009/148349
PCT Pub. Date: Dec. 10, 2009

(65) Prior Publication Data
US 2012/0169174 A1    Jul. 5, 2012

(51) Int. Cl.
*H02K 1/06* (2006.01)

(52) U.S. Cl.
USPC ................................... 310/216.008

(58) Field of Classification Search
USPC ................... 310/216.008, 216.129
See application file for complete search history.

(56) References Cited

U.S. PATENT DOCUMENTS

| | | | |
|---|---|---|---|
| 2,502,185 A | | 3/1949 | Thomas |
| 3,708,707 A | * | 1/1973 | Kranz ............................ 310/433 |
| 4,494,030 A | * | 1/1985 | Mulach et al. ................. 310/256 |
| 4,990,809 A | * | 2/1991 | Artus et al. .................... 310/192 |
| 5,382,859 A | * | 1/1995 | Huang et al. ............ 310/216.008 |
| 6,346,760 B1 | * | 2/2002 | Boardman, IV ....... 310/216.007 |
| 6,720,699 B1 | * | 4/2004 | Shah et al. ..................... 310/197 |
| 7,821,175 B2 | * | 10/2010 | Ionel et al. ............. 310/216.009 |
| 8,154,168 B2 | * | 4/2012 | Hsieh ..................... 310/216.114 |
| 2005/0202235 A1 | * | 9/2005 | Lau et al. ....................... 428/324 |

FOREIGN PATENT DOCUMENTS

| | | |
|---|---|---|
| DE | 2047792 | 4/1972 |
| GB | 211391 | 2/1924 |
| GB | 881468 | 11/1961 |
| JP | 58195448 | 11/1983 |
| RU | 1791909 | 1/1993 |
| RU | 1820451 | 6/1993 |
| RU | 2088019 | 8/1997 |
| RU | 19975 U1 | 10/2001 |
| SU | 1030914 | 7/1983 |
| SU | 1078536 | 3/1984 |

(Continued)

OTHER PUBLICATIONS

M.V. Antonov, et al, Tekhnologiya proizvodstva elektricheskikh masin. Moskva, Energoizdat, 1982, p. 194-195.

(Continued)

*Primary Examiner* — Nguyen N Hanh
(74) *Attorney, Agent, or Firm* — Brandon S. Clark

(57) ABSTRACT

This invention relates to the construction of stators for use in electric motors. A stator for an electric motor comprises an elongate tubular body defining a central cavity in which a rotor can be located, the body defining a series of axial slots extending parallel to the body axis and a series of electrical conductors extending along the channels to form electrical windings, wherein the body is formed from at least two part-circular segments of substantially the same length, the segments together defining the central cavity.

39 Claims, 7 Drawing Sheets

(56) References Cited

FOREIGN PATENT DOCUMENTS

| | | |
|---|---|---|
| SU | 1101975 | 7/1984 |
| SU | 1275651 | 12/1986 |
| SU | 1601695 | 10/1990 |
| SU | 1676005 | 9/1991 |

OTHER PUBLICATIONS

N.V. Vinogradiv, "Proizvodstvo elektricheskikh machine. Moskva-Leningrad", Gosudarstvennoe energeticheskoe izdatelstvo, 1961, p. 186-190.

A.E. Alekseev, "Konstruktsiya elektricheskikh mashin. Moskva-Leningrad", Gosudarstvennoe energeticheskoe izdatelstvo. 1985, p. 367-377.

Office action from the equivalent Russian patent application No. 2010153584 issued on May 30, 2012.

International Search Report issued in PCT/RU20081000350 on Mar. 12, 2009, 2 pages.

Written Opinion issued in PCT/RU2008/000350 on Mar. 12, 2009, 5 pages.

* cited by examiner

AXIALLY-SPLIT STATOR CONSTRUCTION FOR ELECTRIC MOTORS

TECHNICAL FIELD

This invention relates to the construction of stators for use in electric motors. In particular, it relates to a stator construction, a motor incorporating the stator, and a method of making the stator.

BACKGROUND ART

Electrical motors often use wound stators: this is particularly true for AC motors (both asynchronous and synchronous) as well as DC brushless motors. The winding of these stators can be quite difficult (and costly) when the motor diameter is small in comparison to its length. Such long, thin motors are commonly used in electric submersible pumps (ESPs) of the type used in the oil industry to provide artificial lift in wells that do not have enough pressure to produce to the surface.

Stators are typically constructed from a stack of thin metal plates to limit the strength (and associated loss) from eddy currents. The thickness of these plates is typically in the range of 1 millimeter (or less). It may therefore take 10,000 plates for the construction of long ESP motors and these plates need to be properly aligned so that the wire channels are properly defined. FIG. 1 shows a motor construction comprising a stator 10 formed from a stack of such plates with holes defining the wire channels in which windings 12 are provided. A rotor 14 is located in a central cavity.

The winding of these long motor stators is difficult as the wires run in long narrow slots formed in the stack of stator metal laminations. The wire is typically passed through the slots by pulling it with a long needle: this process is slow and tedious. The filling of the slots by the wires is also often limited, reducing the optimum usage of the motor section for high magnetic flux and optimum heat transfer.

With these long stators, the reaction torque from the stator is often transmitted to the motor housing by friction. The laminations are pre-compressed axially at high load. This load is supported by large circlips which are inserted in a circumferential groove in the housing.

This construction technique of such stators is found with a wide variety of motors, such as three-phase AC motors or certain DC (brushless) motors.

DISCLOSURE OF THE INVENTION

This invention provides a construction of a stator so allows the wire can be laid in the stator slot instead of being threaded from end to end in the conventional approach. To achieve this, the stator is 'split' into 2 or more segments. Each stator segment is wound by laying wires into the stator groove between the poles. Finally the stator is assembled from the segments and then installed in the motor housing. The reaction torque can be transmitted form the stator to the motor housing by specific constructions related to this stator construction. The main benefit of this invention is the simplification of stator winding which leads to improved reliability and cost reduction while ensuring higher winding reliability.

A first aspect of this invention provides a stator for an electric motor, comprising:

an elongate tubular body defining a central cavity in which a rotor can be located, the body defining a series of axial slots extending parallel to the body axis; and a series of electrical conductors extending along the channels to form electrical windings;

wherein the body is formed from at least two part-circular segments of substantially the same length, the segments together defining the central cavity.

The segments are preferably joined to form the body in such as way as to minimise magnetic losses in the contact between segments. The contact surfaces of the segments can be geometrically corrected before assembly to minimise the magnetic losses.

The body is preferably formed from a stack of plates. At least one channel can be defined in the outer surface of each segment for receiving a support bar which can hold the stack in compression. The support bar can be provided with a nut to compress the stack when the bar is in the channel. Alternatively, one or more wedges are provided to compress the stack when the bar is in the channel. The support bars are typically arranged to maintain the axial alignment of the plates in each stack.

At least one spacer is preferably provided in the stack of each segment, the axial position of the spacer being the same in each segment. A tangential dowel pin can be provided to locate the spacer in position.

The support bar typically acts to transfer torque from the plates to the spacer. This can be achieved by friction between the plates and/or deformation of the bars.

The spacers are preferably provided with inter-engaging pin and axial key groove formations at contacting surfaces.

An attachment system allowing connection of adjacent spacers can be provided, such as a circumferential tie.

The spacers are preferably made of material which limits eddy currents. Such materials are typically electrically insulating materials such as plastic or ceramic. In one embodiment, the spacers are made of laminations of low magnetic permeability material which can be glued together.

In one convenient arrangement, the spacers are arranged to support a radial bearing of a rotor.

The plates of the stack can be glued together to form the stacks. They can also be non-planar, defining inter-engaging formations that act to transmit torque between the plates.

In another embodiment, each segment comprises at least one U-shaped formation defining a single slot. The formation can be constructed from a stack of U-shaped plates. In one preferred embodiment, each segment comprises a plurality of formations connected together.

A second aspect of the invention provides an electric motor comprising a stator according to the first aspect of the invention, a motor housing in which the stator is located, and a rotor mounted within the central cavity of the stator.

Radial pins, rivets or keys can be installed between the housing and the rotors to transmit reaction torque in operation. The pins, rivets or keys can engage in spacers forming part of the stator construction.

In one preferred embodiment, the stator comprises one or more axial keys which engage in corresponding in grooves in the internal diameter of the housing to transmit reaction torque. The keys can be provided at the intersection between stator segments.

Circlips can be installed at the end of the stator to compress the segments together.

A third aspect of the invention provides a method of making a stator according to the first aspect of the invention, comprising installing the conductors forming the windings in each stator segment before the segments are brought together to form the body.

The slots typically open towards the cavity, the winding being made by pushing wires into the slots.

In one embodiment, a substantially complete winding for one slot is pre-moulded before installation in the slot.

The stator segments are preferably joined together by means of a circumferential tie wrapped at a pre-defined axial distance.

One preferred embodiment comprises forming each segment from a stack of plates in a jig, installing the windings in the slots of that segment, providing a support structure for the stack, removing it from the jig, and connecting the segments together to form the stator.

Other aspects of the invention will be apparent from the following description.

MODE(S) FOR CARRYING OUT THE INVENTION

In accordance with this invention, the stator of an electric motor is 'split' axially in several segments (typically two or although more are possible). Each segment is wired individually by running the wire between the poles of the stator. When each stator segment is wound, the segments are then grouped to form the normal cylindrical stator and the grouped stator can then be installed in the motor housing for proper support and transmission of the reaction torque.

This invention is primarily related to the construction of stators for DC brushless motors with single tooth winding. However, it can be allied to any motor with an external, wound stator. The invention facilitates stator construction as well as increasing its reliability. It also allows the use of thinner motor housings.

Figure 1:
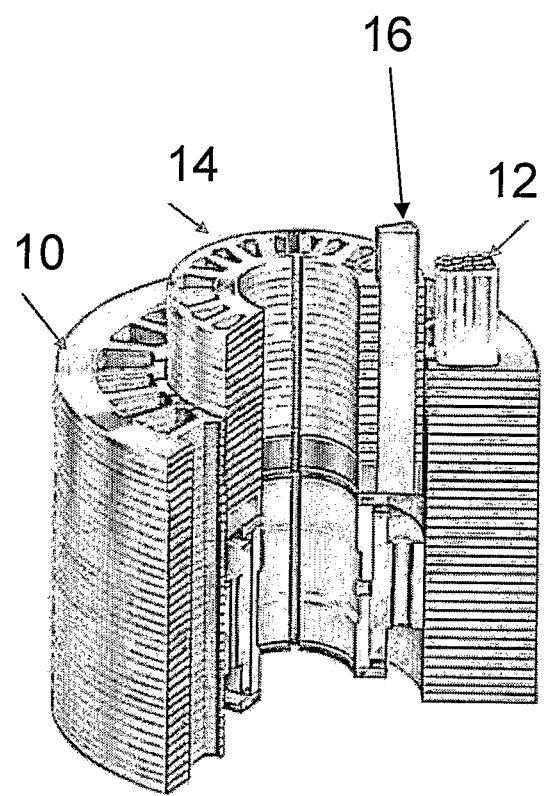
FIG. 1 shows a prior art motor construction.
Figure 2:
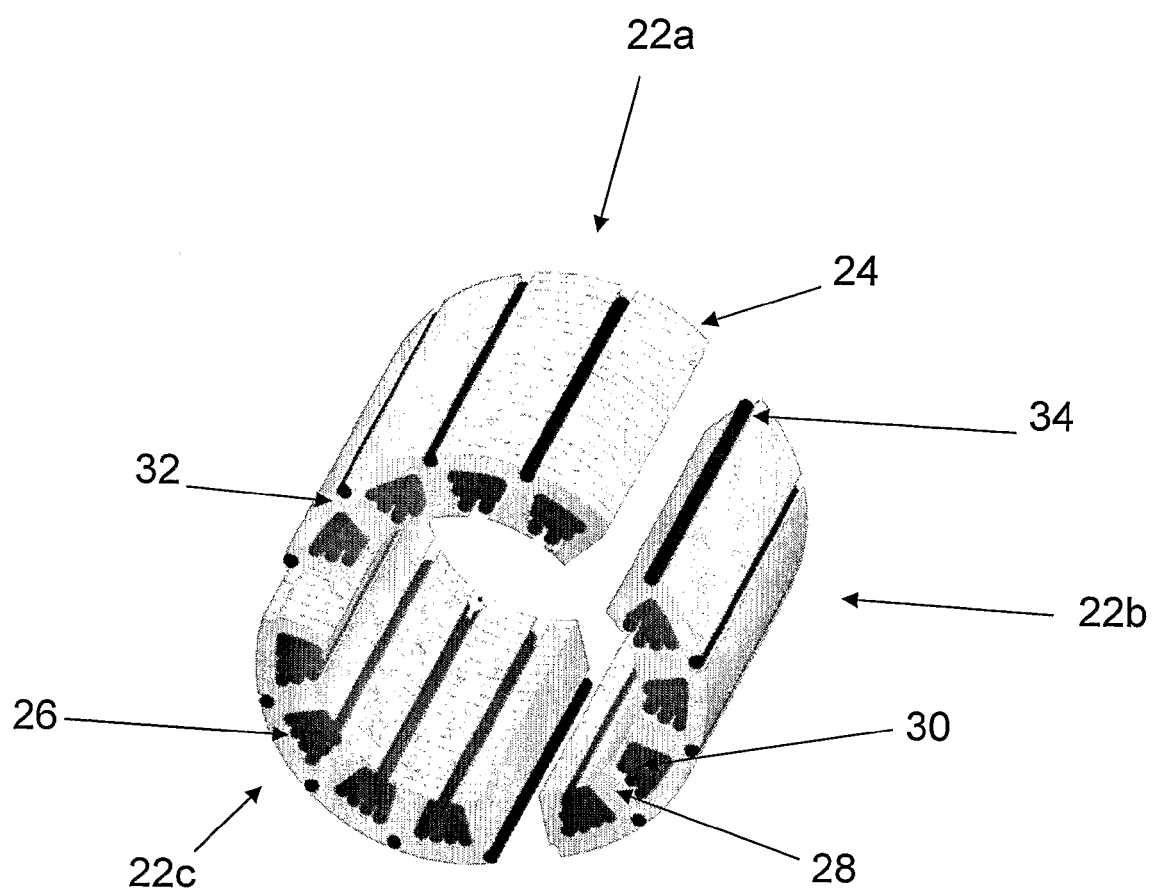
FIG. 2 shows a three segment stator according to an embodiment of the invention.
Figure 3:
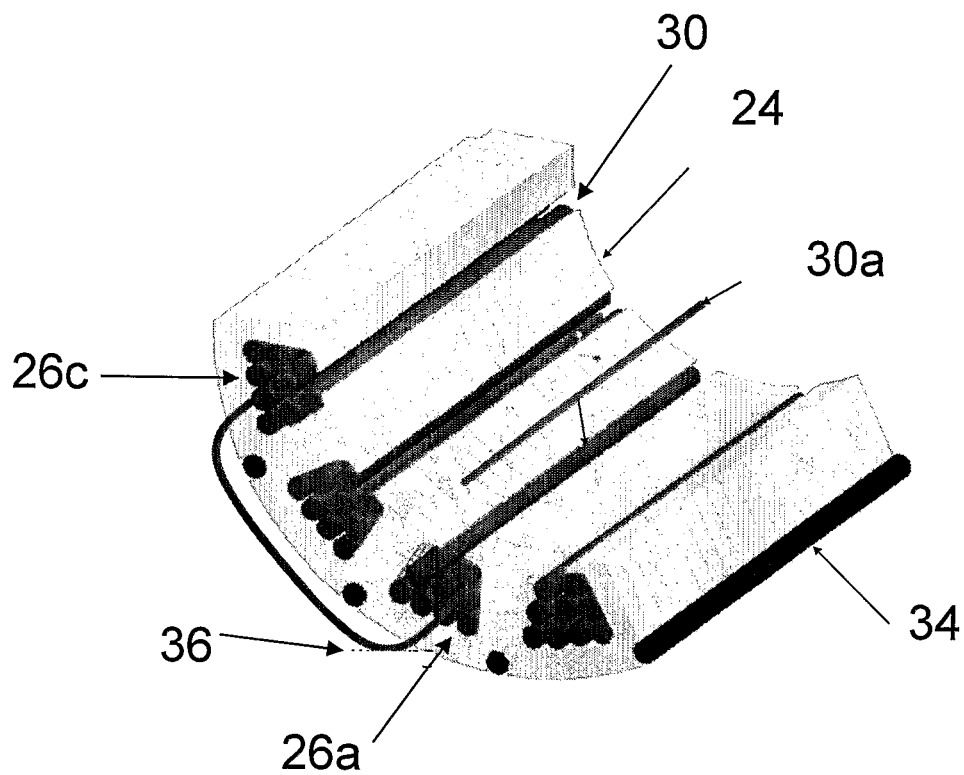
FIG. 3 shows one of the segments of FIG. 2.

FIG. 2 shows a three segment stator and FIG. 3 shows one of the segments in accordance with the invention. The stator 20 comprises three substantially identical segments 22a, 22b, 22c formed from a stack of plates 24. The plates define slots 26 between poles 28. Winding wires 30 are positioned in the slots 26. Channels 32 are provided in the outer surface of the segments in which support or pull bars 34 are located.

Once the plates 24 have been formed as a segment, new wires 30a can be positioned in the slots from 'within' the stator cavity, for example by winding around the ends 36 of the stator between different slots 26a, 26c.

In one embodiment of this invention, a split stator is constructed by starting with conventional laminated stator which is then split it into two or three segments. The segmented laminations are stacked to make the split stator segment. Then the wires are installed in the grooves/slots between poles and provide the proper stator winding as is described above.

The lay-out of wire in the slots of the split stator is relatively easy: the wire can be laid (pushed) into the groove between motor poles 28 which is obviously much easier than threading it through the whole length of the channel from one end to the other as is done in the prior art. This in turn allows a faster and more reproducible winding procedure. With the split stator, the wiring installation can also be automated.

Figure 4:
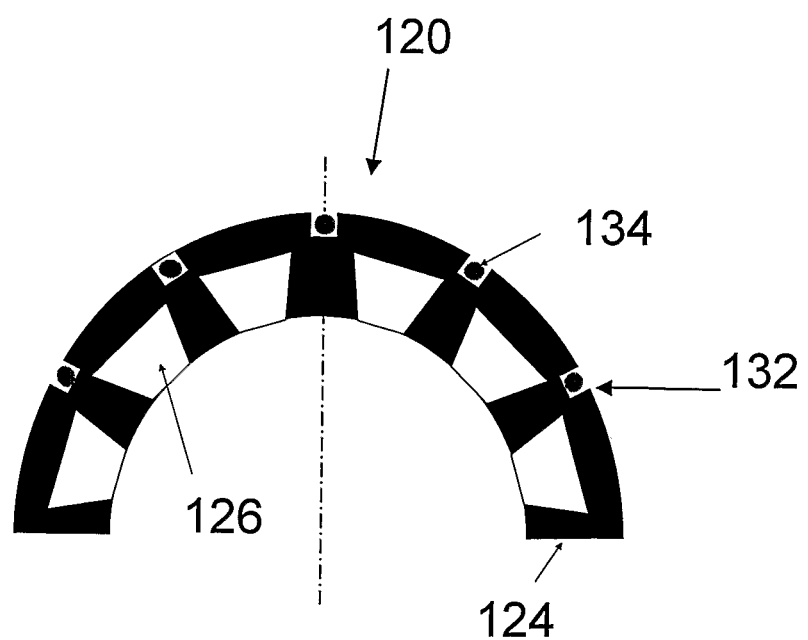
FIGS. 4, 5 and 6 show an end, perspective and side views of a 180° stator segment in accordance with another embodiment of the invention.
Figure 5:
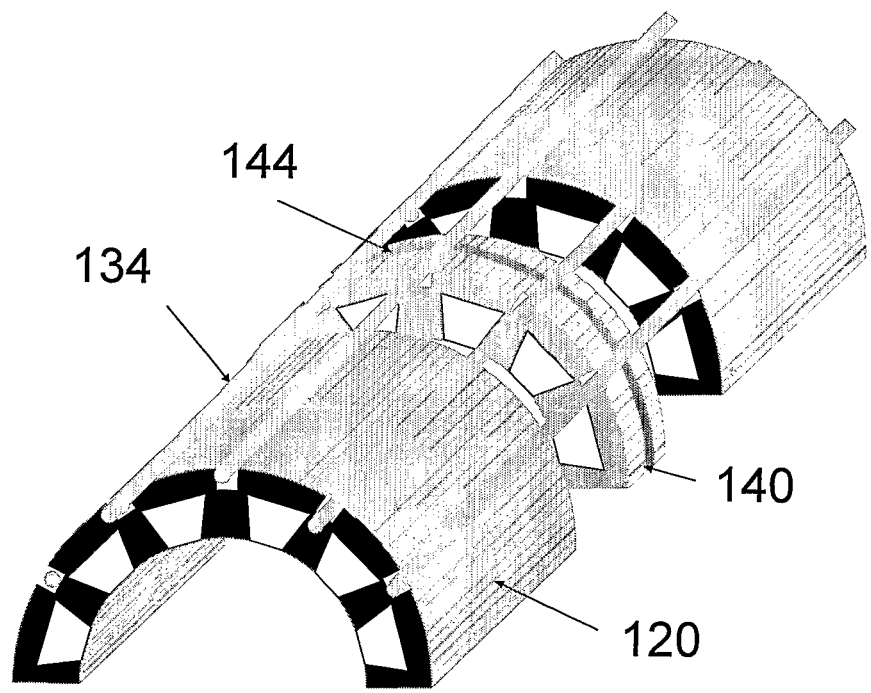
Figure 6:
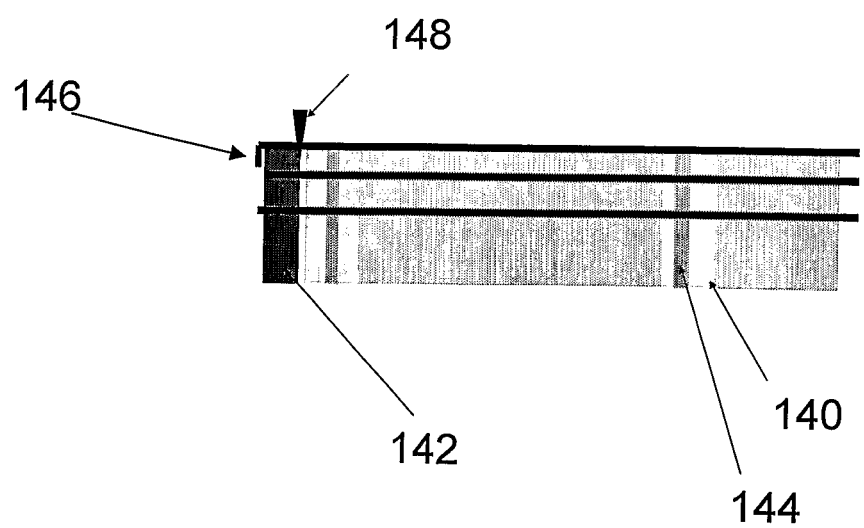

The following part of the description, focuses on a two-part split stator as is shown in FIGS. 4, 5 and 6 which show an end, perspective and side views of a 180° stator segment using the corresponding numbers in the 100 series for the features shown in FIGS. 2 and 3.

With the split stator, pull bars (support bars) 134 are installed in slots 132 at the periphery of the lamination 124. These pull bars 134 allow the laminations 124 to be compressed together to ensure a mechanical integrity of the split stator segment 120. With a 180 degree split, the resultant force produced by the set of pull bars is inside the geometry of the split segment. This ensures that the lamination stays flat after compression. The laminations are typically not fully flat after preparation so without proper care, there is a risk that the split stator segment can be bent in its main axial plane.

With the proposed construction (the resultant force inside the surface of the split lamination), it is possible to keep the split stator straight. Furthermore, the force on the pull bar can be adjusted so that the resultant force is exactly into the centre of inertia of the surface of the split lamination.

If no pull bars are installed at the extremity of the split segment, there is a risk that the corners of the split stator segments are not exactly in the proper plane with the rest of the split lamination. This potential problem can be suppressed by the use of a rigid spacers 140 and stress distribution blocks 142.

In the split stator, spacers may also be installed at fixed, predetermined distances. These spacers have several roles:

support for the bearings for the motor rotor (not shown);

provide a flat reference surface to ensure that the stacked split laminations stay flat (especially, the lamination corners);

proper azimuthal positioning of the pull-bars;

use of pin and keys to allow the proper alignment of the split stator segments to form a complete stator;

support of tie-wrap to hold the stator segments together to for a single stator; and a transmission mechanism for the stator reaction torque onto the motor housing.

These spacers 140 & 142 should be made of material to limit the appearance of eddy currents. These currents are generated by the fluctuating current in the stator winding. They can also be generated either due to the rotation of the magnet of the rotor (if the rotor is magnetized in these axial position). One approach to construct the spacers of electrically non-conductive materials such as plastic or ceramic. Another approach is to construct the spacers of laminated steel plate which are glued together to form the spacer block. If the rotor is not magnetized at these axial positions, the lamination of the spacer should be non-magnetic to further limit the appearance of eddy currents.

The split laminations are typically stacked in one meter lengths. Spacers can then be introduced between successive lamination stacks to build up the finale stator length. Such construction allows long stator sections to be constructed (up to 10 meters or more). The pull bars are the installed in the grooves/channels running along the periphery of the stacks (laminations and spacers), being set under tension to ensure compression of the lamination.

The pull bars 134 may be set under tension by various mechanisms. They can be provided with threaded portions at their ends on which nuts can be attached to provide tension. However, where the pull bars are at the periphery of the stator segment, nuts would normally interfere with the housing. Therefore, the pull bars can be slightly bent (or curved) at their end portions 146 within a stress distribution block 142 to allow the proper installation of the nuts at sufficient distance from the periphery.

Another method to stress the pull bars is to equip the pull bars with a hook on one end and nut on the other end. With such a method, adjacent pull bars can be installed in the slots with nut and hook facing opposite ends. This limits the parasitic effect of the bended extremity.

In another embodiment, the pull-bars are equipped with hook at both ends and are placed in tension by forcing a wedge 148 between the stress distribution block and the first spacer. By pushing the wedge 148 radially deeper to the centre, the pull bars can be then set to the desired tension tension. When proper tension is achieved, the part of the wedge outside the general surface of the stator can be removed (for example by grinding).

For a typical ESP stator, the pull bars can generate several tons of force on the laminations. This ensures that a high friction force can be applied between lamination plates. The reaction torque generated during motor operation can be transmitted from a lamination plate to the neighbouring plates by virtue of this friction. At the interface between the lamination plate and the spacer, the torque generated over the plate stack between the spacers must be transmitted to that spacer. This process requires an appropriate amount of axial pulling force for sufficient friction capability. The pull bars are set to bend in a tangential direction by the reaction torque of the lamination. This deformation has to be limited to avoid deformation of the axial pattern of the wire groove. At the intersection between pull-bars and spacer, the pull-bars are set in shear (as a reaction to bending). With an appropriate pull-bar section, these two mechanisms (friction between plates and shear of the pull bar) allow proper force torque transfer onto the spacers, when the motor is operating.

The laminations can be glued together to form a rigid stack. The glue allows torque transmission from one layer to the next one. This can allow reduction in usage of pull-bars.

The lamination may not be fully planar, so that 'teeth' of geometrical features on one plate engage with those on the next one, so that the plates cannot rotate relative to each other. This also allows transmission of reaction torque form one plate to the next.

Once the stator segment is constructed over its complete length, including spacers, pull bars and stress distribution spacers, and with force loading on the pull-bars, the winding can then easily performed by laying the wires in the stator slots. After finalizing the wiring, the wire slot can be filed with appropriate material for optimum heat transfer and force transfer to the stator, as well as limiting the wire vibration during motor operation (which can increase the longevity of the stator).

With some types of winding (such as single tooth winding), the wire can be first preformed on a rectangular coil which can be installed in the stator around one stator pole. These preformed coils can be coated with an appropriate compound to hold the wire properly in place in the slots.

The segments can be mounted in a jig for winding. In order to move the segments from the jig to the final assembly point where they are combined to form the stator, it may be useful to provide a temporary support in addition to any pull bars. Alternatively, the pull bars themselves may be sufficient to maintain the geometry of the segment.

When the stator segments are ready, they can be joined together to form the cylindrical stator. In the case of the split stator in two halves, the proper alignment is ensured by providing tangential dowel pins installed in the stator spacers. However, the axial spacing of the holes for the dowel pins may not be equidistant for the two halves, as the compression of the laminations may not be perfect and some laminations may have planar defects. For a solution of this problem, a dowel pin is used in only one set of spacers at one axial position. For the other spacers, the dowel pin is replaced by key parallel to the motor axis. These keys engage in corresponding key grooves in the motor housing that are also parallel to the axis of the motor and are longer than the keys. With this arrangement, the two halves of the stator are aligned radially by the two keys, while allowing some mismatch in length for the split stator segments.

When the stator segments are properly aligned to form the stator, they are attached to each other by circumferential tie wraps. These tie wraps are laid typically in the circumferential grooves of the stator spacer.

In this form, the stator is fully assembled with proper wiring. It forms a complete, solid structure which can be manipulated for future manufacturing operations.

The assembled stator can then be installed in the housing. When in proper place, the mechanism to transmit the reaction torque from the stator to the housing can be installed. Different mechanisms are possible. Circlips can be installed in a circumferential groove of the stator housing. With this process, axial compression is required between the stator and the circlip to ensure sufficient axial friction to allowing torque transmission. With this system, the pull-bars should be taking the major load so as to allow sufficient axial loading onto the circlips. Ring spacers are typically needed between the end of the stator and the circlips. If the pull bars are initially not too heavily loaded, there will be a sufficient reserve of elastic deformation to allow length compensation to accommodate variations in lengths of the segments.

Another approach is to lock the spacer against rotation relative to the housing by use of a radial element though the housing. One such approach is to drill radiallly through the housing and the spacer and install locating pins. These pins can be press fitted in the housing to ensure that they are held and sealed in place. It may also be advantageous to weld the pins onto the housing after installation. With proper pin size, only a few pins will be required for each spacer. Rivets can be used in place of pins.

The use of pins or rivets allows the circlip groove to be removed, in turn allowing the use of thinner housing.

Another solution to transmit the reaction torque to the housing is to use key between the stator and the housing. The key can run over the full length of the stator or only across the spacer. To simplify the construction, the key can be installed at the interface between stator segments. This method of stator construction can be used for a motor with excellent performance if there is a minimum magnetic flux in the gap for jointing the split stator segments. This applies extremely well for a single tooth winding DC motor. For other types of motor, magnetic flux is exchanged across each interface radial surface, in which case, it is vital to ensure good metallic coupling from one stator segment to another. In this case, the radial contact surface can be geometrically corrected by machining before joining the segments.

Another approach to minimize the effect of radial air gap between the stator segments is to stagger the laminations. At the radial interface, the laminations stop alternatively at two different azimuths. When stacking, the stator segments, the laminations of each stator segment have to be inter-engaged with those of the others. This increases the overlapping surface, reducing the strength of the magnetic flux in the air gap.

In an alternative method for construction of the split stator the laminations are made of N segments (in particular 2 half round) with locking feature to insure coincident centerline after assembly and the magnet wire slots in the lamination are open to the stator bore.

The lamination N segments (optionally halves round) are loaded into an assembly fixture in stacks of equal length and compressed. The fixture is designed to limit interference with the lamination internal diameter: In one design, the assembly fixture has a overall shape of a trough allowing the staking of the lamination plates perpendicular to the trough main axis. At one extremity, a step in diameter in the through insuring a positive stop of the stack in the trough; at the other extremity, a segment of the piston (corresponding to the trough internal diameter allows to compress the lamination stack. The assembly fixture is configured such that when it is closed the N stator segments (optionally the 2 stator halves) are brought together to form a complete stator assembly: also the internal stator bore has minimal volume interference from the assembly fixture. The stator wires are installed into the split stator lamination segments (optionally the stator halves) through the open slots. When the windings are competed for the N stator segments, a round mandrel is installed in one of the stator segment (optional stator halves). The mandrel is configured with keeper rings so that compression of the lamination stacks can be maintained when the assembly fixtures are removed form the stator. The assembly fixtures are closed and compression force is released so that the assembled laminations are held in compression between the keeper rings on the mandrel.

Figure 7:
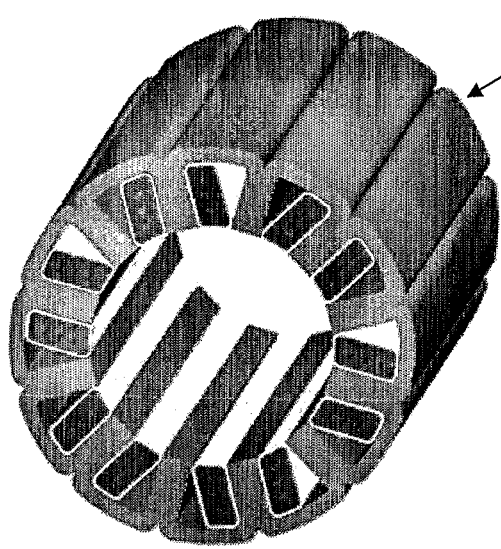
FIGS. 7-9 show details of further embodiments of the invention.
Figure 8:
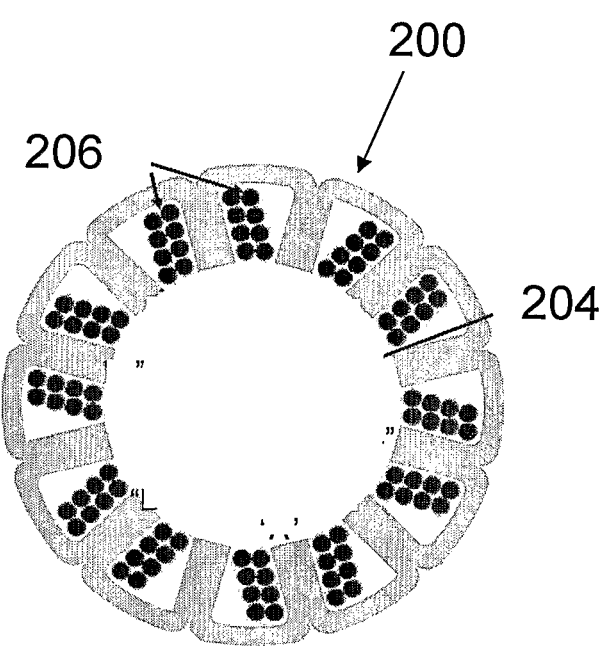
Figure 9:
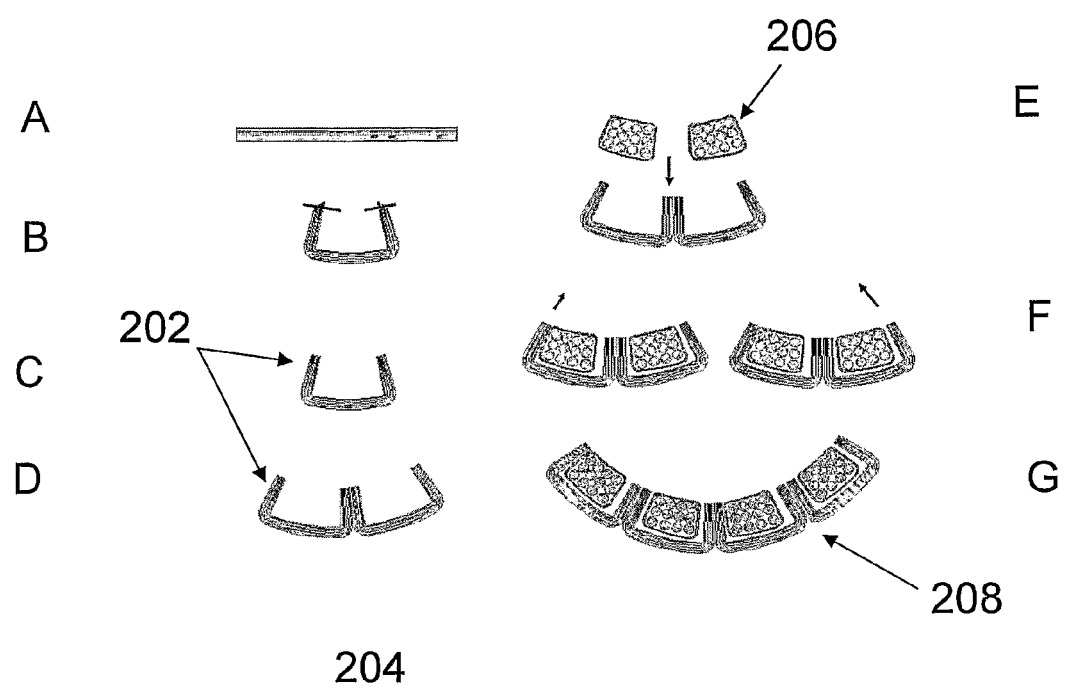

The stator lamination assembly on the mandrel can then be pushed with the assembly fixture into the motor housing. The lamination assembly can be retained in the motor housing between circlips installed into grooves in the bore of in stator housing as described previously. The laminations are further compressed between the circlips such that the retaining rings on the mandrel can be removed and mandrel is pulled from the stator bore leaving the assembled stator in the motor housing held in compression between the circlips The concept of split stator also works with modified type of magnetic lamination as is shown in FIGS. 7-9. In this proposal, the lamination is axial. In this construction, the lamination 200 has a general U shape. Multiple sheets of metal are stacked (FIG. 9A) to ensure sufficient magnetic section to allow the motor flux to be distributed in the motor section. The stack is then folded into a basic U shape (FIG. 9B) and unnecessary parts are cut off (FIG. 9C) to define a basic cell. Two such cells 202 are combined to define a single stator pole 204 (FIG. 9D). Pre-wound coils 206 are placed in the cells 202 so as to embrace the pole 204. Two such units are then combined (FIG. 9F) to create a stator segment 208 (FIG. 9G).

Again after winding installation in the split stator segment, the segments are joined together to form the stator shown in FIGS. 7 and 8. With such construction, the use of spacers at pre-defined axial distances is more difficult, as the u-shaped elements may run the whole length of the motor. However, the U-shaped element can be limited in length for the use of spacers which would offer similar benefit as in previous construction.

In case of a u-shaped element over the whole length of the motor, joining of U-shaped elements can be achieved by glue on the flat surface of the U. The gluing method can be used for construction of each stator segment. It can also be used to join the stator segments to form the whole stator. The stator segment can also be jointed by tie wrap, as in previous embodiments. For proper respect of the overall tubular shape, the external U metal layer of each thick U, can have a metal cut at the periphery of the U at pre-set length to from a circumferential groove for the installation of the tie-wraps.

For the support of the radial bearing of the motor rotor, the U shape metal can have cuts at a fixed distance, so as to form a groove in the final stator at its internal diameter. This groove allows the proper location of the fixed sleeves of the radial bearings.

For torque transmission, pins or rivets across the motor housing can be a used, as with the previous embodiment.

The U-shaped ferromagnetic system is acceptable for the purpose of support of the ferromagnetic field in the motor, as the field lines are nearly parallel to the edge of the steel U shaped plates.

While a number of embodiments of the invention have been described, it will be apparent that other changes can be made within the scope of the invention.

The invention claimed is:

1. A stator for an electric motor, comprising:
    an elongate tubular body defining a central cavity in which a rotor can be located, the body defining a series of axial slots extending parallel to the body axis; and
    a series of electrical conductors extending along the channels to form electrical windings;
    wherein the body is formed from at least two part-circular segments of substantially the same length, the segments together defining the central cavity,
    wherein the body is formed from stacks of plates,
    wherein at least one channel is defined in the outer surface of each segment for receiving a support bar that comprises at least one hook, and
    wherein one or more wedges are provided to axially compress at least one of the stacks of plates when the bar is in the channel.

2. A stator as claimed in claim 1, wherein the segments are joined to form the body in such as way as to minimise magnetic losses in contact surfaces between segments.

3. A stator as claimed in claim 2, wherein the contact surfaces of the segments are geometrically corrected before assembly to minimise the magnetic losses.

4. A stator as claimed in claim 1, wherein the support bar holds at least one of the stacks in compression.

5. A stator as claimed in claim 1, wherein the support bar is provided with a nut at one end to compress at least one of the stacks when the bar is in the channel.

6. A stator as claimed in claim 1, comprising a plurality of support bars wherein the support bars are arranged to maintain the axial alignment of the plates in each stack of the stacks of plates.

7. A stator as claimed in claim 1, wherein at least one spacer is provided in each one of the stacks that forms a respective one of the segments, the axial position of each of the at least one spacer being the same in each of the segments.

8. A stator as claimed in claim 7, wherein a tangential dowel pin is provided to locate each of the at least one spacer in position.

9. A stator as claimed in claim 7, wherein the support bar acts to transfer torque from at least one of the stacks of plates to the at least one spacer of the at least one of the stacks of plates.

10. A stator as claimed in claim 9, wherein the transfer of torque takes place by plate-to-plate friction.

11. A stator as claimed in claim 9, comprising a plurality of the bars wherein the transfer of torque takes place by deformation of the bars.

12. A stator as claimed in claim 7, wherein each of the at least one spacer is provided with an inter-engaging pin and an axial key groove formation at contacting surfaces.

13. A stator as claimed in claim 7, wherein the spacers are provided with an attachment system allowing connection of adjacent spacers.

14. A stator as claimed in claim 13, wherein the attachment system comprises a circumferential tie.

15. A stator as claimed in claim 7, wherein the spacers are made of material which limits eddy currents.

16. A stator as claimed in claim 15, wherein the spacers are made of electrically insulating materials.

17. A stator as claimed in claim 16, wherein the electrically insulating material is plastic or ceramic.

18. A stator as claimed in claim 15, wherein the spacers are made of laminations of low magnetic permeability material.

19. A stator as claimed in claim 18, wherein the laminations are glued together.

20. A stator as claimed in claim 7, wherein the spacers are arranged to support a radial bearing of a rotor.

21. A stator as claimed in claim 1, wherein the plates of the stacks of plates are glued together to form individual stacks of the stacks of plates.

22. A stator as claimed in claim 1, wherein the plates of the stacks of plates are non-planar, defining inter-engaging formations that act to transmit torque between the plates of each stack of the stacks of plates.

23. A stator as claimed in claim 1, wherein each segment comprises at least one U-shaped formation defining a single slot.

24. A stator as claimed in claim 23, wherein the formation is constructed from plates that form one of the stacks of plates as a stack of U-shaped plates.

25. A stator as claimed in claim 23, wherein each segment comprises a plurality of formations connected together.

26. An electric motor comprising
    a stator that comprises
        an elongate tubular body defining a central cavity in which a rotor can be located, the body defining a series of axial slots extending parallel to the body axis; and
        a series of electrical conductors extending along the channels to form electrical windings;
        wherein the body is formed from at least two part-circular segments of substantially the same length, the segments together defining the central cavity,
        wherein the body is formed from stacks of plates,
        wherein at least one channel is defined in the outer surface of each segment for receiving a support bar that comprises at least one hook, and
        wherein one or more wedges are provided to axially compress at least one of the stacks of plates when the bar is in the channel;
    a motor housing in which the stator is located; and
    a rotor mounted within the central cavity of the stator.

27. An electric motor as claimed in claim 26, wherein radial pins, rivets or keys are installed between the housing and the rotors to transmit reaction torque in operation.

28. An electric motor as claimed in claim 26, wherein the pins, rivets or keys engage in spacers forming part of the stator construction.

29. An electric motor as claimed in claim 26, wherein the stator comprises one or more axial keys which engage in corresponding grooves in the internal diameter of the housing to transmit reaction torque.

30. An electric motor as claimed in claim 29, wherein the keys are provided at the intersection between stator segments.

31. An electric motor as claimed in claim 26, where circlips are installed at the end of the stator to compress the segments together.

32. A method of making a stator, wherein the stator comprises
    an elongate tubular body defining a central cavity in which a rotor can be located, the body defining a series of axial slots extending parallel to the body axis; and
    a series of electrical conductors extending along the channels to form electrical windings;
    wherein the body is formed from at least two part-circular segments of substantially the same length, the segments together defining the central cavity,
    wherein the body is formed from stacks of plates,
    wherein at least one channel is defined in the outer surface of each segment for receiving a support bar that comprises at least one hook, and
    wherein one or more wedges are provided to axially compress at least one of the stacks of plates when the bar is in the channel; and
    the method comprising installing the conductors forming the windings in each stator segment before the segments are brought together to form the body.

33. A method as claimed in claim 32, wherein the slots open towards the cavity, the winding being made by pushing wires into the slots.

34. A method as claimed in claim 32, wherein a substantially complete winding for one slot is pre-molded before installation in the slot.

35. A method as claimed in claim 32, wherein the stator segments are joined together by means of a circumferential tie wrapped at a pre-defined axial distance.

36. A method as claimed in claim 32, comprising forming each segment from a stack of the stacks of plates in a jig, installing the windings in the slots of that segment, providing a support structure for the stack, removing it from the jig, and connecting the segments together to form the stator.

37. A method as claimed in claim 32, comprising forming each stator segment from a stack of the stacks of plates in a jig or assembly fixture, installing the windings in the slots of that segment, connecting the wound stator segments into a stator around a central support structure for the stator stack, removing the jigs form the stator.

38. A method of claim 32, comprising locking the stator into a motor housing.

39. A method as claimed in claim 38, wherein the locking locks the stator into the motor housing by positioning two circlips to impose axial compression of the stacks of plates of the stator.

* * * * *